United States Patent [19]

Straka

[11] Patent Number: 5,761,903
[45] Date of Patent: Jun. 9, 1998

[54] LOOP COMBUSTION SYSTEM

[76] Inventor: Benedict J. Straka, 44 Water St., Jenners, Pa. 15546

[21] Appl. No.: 610,464
[22] Filed: Mar. 4, 1996
[51] Int. Cl.$^6$ ............................................. F02N 25/06
[52] U.S. Cl. .............................. 60/278; 60/281; 123/567
[58] Field of Search .............................. 123/23, 24, 567, 123/568, 569; 60/281, 278

[56] References Cited

U.S. PATENT DOCUMENTS

| | | | |
|---|---|---|---|
| 2,742,885 | 4/1956 | Thwaites | 60/278 |
| 2,786,457 | 3/1957 | Mickley | 60/278 |
| 3,035,561 | 5/1962 | Siegler | 60/278 |
| 3,241,536 | 3/1966 | Falzone | 60/278 |
| 3,702,110 | 11/1972 | Hoffman et al. | 123/567 |
| 3,877,450 | 4/1975 | Meeks | 123/567 |
| 4,674,463 | 6/1987 | Duckworth et al. | 123/568 |
| 4,984,426 | 1/1991 | Santi | 123/567 |
| 5,016,599 | 5/1991 | Jubb | 123/569 |
| 5,076,055 | 12/1991 | Jubb | 123/569 |

Primary Examiner—Thomas N. Moulis
Attorney, Agent, or Firm—Carothers & Carothers

[57] ABSTRACT

An oxygen dependent loop combustion system to restrict release of polluted air into the atmosphere.

10 Claims, 3 Drawing Sheets

5,761,903

LOOP COMBUSTION SYSTEM

BACKGROUND OF THE INVENTION

In air dependent combustion systems, such as gasoline and diesel, polluted air is released into the atmosphere.

SUMMARY OF THE INVENTION

The present invention restricts the above-mentioned release of polluted air into the atmosphere.

DESCRIPTION OF THE PREFERRED EMBODIMENTS

Figure 1:
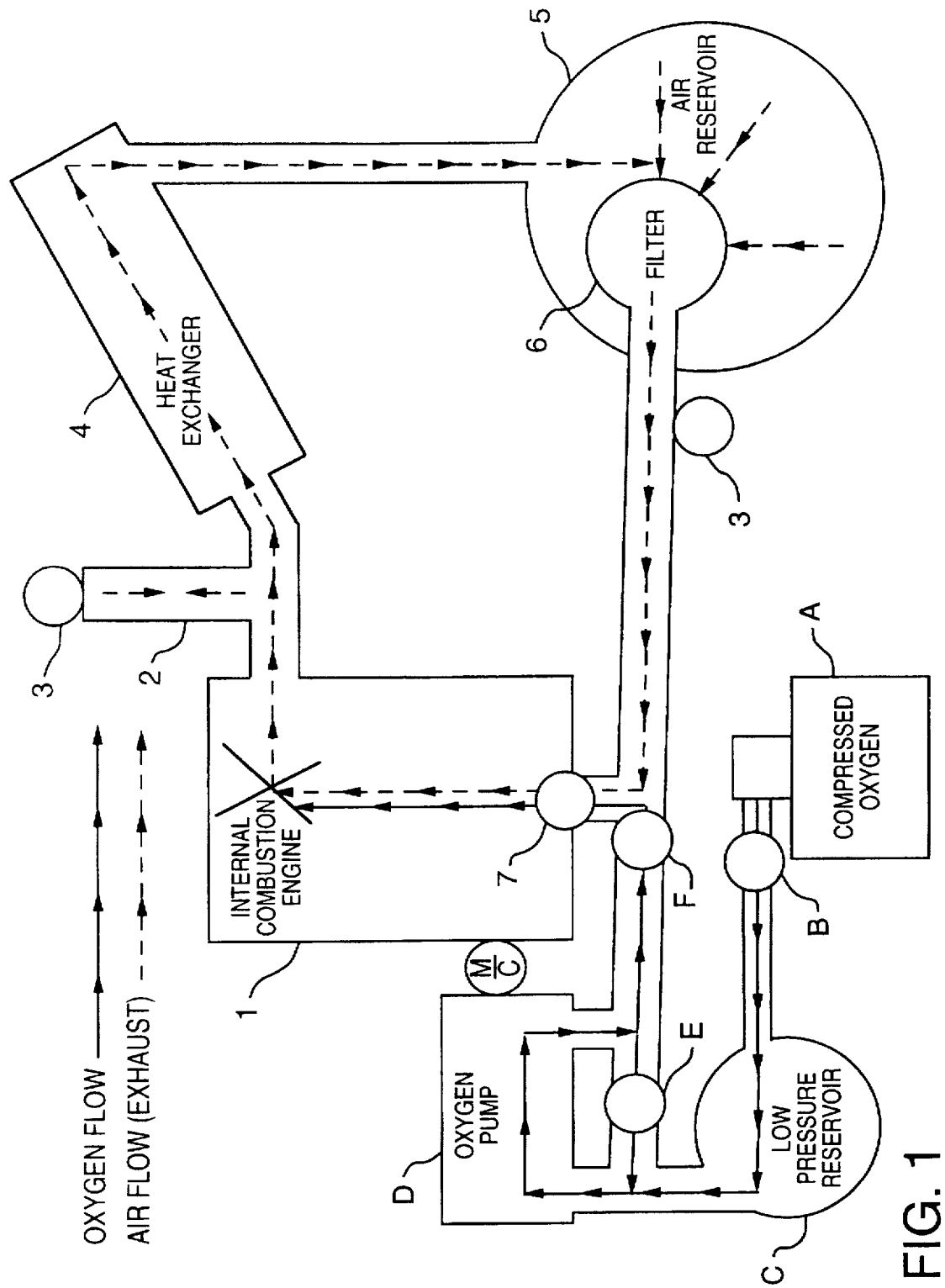
FIG. 1 is a schematic diagram showing the present invention applied to an internal combustion system.

An object of this invention is to "CLOSE THE LOOP" in two air dependent methods of combustion. They are, 1. Internal Combustion engines, such as gasoline and diesel; and 2. Solid Fuel Burning, such as generating stations, and incinerators. The term "CLOSE THE LOOP" means to recycle a particular volume of exhaust gases in a combustion system that restricts or prohibits the release of polluted air from this system. This is accomplished by adding the necessary oxygen to this volume of exhaust air before it is reused, thus rendering the "CLOSED LOOP" system air independent. Since both the internal combustion and solid fuel types of "CLOSED LOOP" systems share common elements and by concept are one and the same, only one invention is claimed.

The combustion of fossil fuels in air dependent systems, regardless of the method, results in two changes of air qualities. 1. Pollution of atmospheric air with smoke, carbon dioxide and carbon monoxide. 2. Depletion of the oxygen content of that volume of air used in the combustion process. The "CLOSED LOOP" system of combustion addresses both of these qualities. First, by substantially locking this polluted air into a system, the smoke from the combustion process is recycled through the system, with much of the smoke particles either filtered out or reduced to ash. Second, by adding the necessary oxygen to this recycled volume of air, prior to combustion, this polluted air can be reused over and over, producing heat and mechanical energy with minimum pollution of the atmospheric air with smoke, carbon dioxide and carbon monoxide.

Reviewing the constituents of pure dry air, they are oxygen 20.93%, nitrogen 78.10%, carbon dioxide 0.03%, and other rare gasses 0.94%. If we were to apply the above standard to the combustion process, simply by adding the 21% oxygen to the recycled air at one point and remove another 21% of polluted gas at another point, we have reduced total air pollution by 80%. And with the closed loop system of combustion there are two tap locations where this polluted gas may be withdrawn and further treated prior to release into the atmosphere.

Closed Loop Internal Combustion Engine Operation

Beginning inside the engine 1 after combustion has occurred, exhaust gas exits the combustion chamber and is directed towards the heat exchanger, passing by a dead ended stand pipe 2. The purpose of the dead end stand pipe 2 is to provide a buffer for the surge of exhaust gas headed for the heat exchanger. The size of this stand pipe is about equivalent to the cubic inch displacement of the engine. Two vent or bleed off valves 3 are provided to protect the system from a build up of gas pressure that may have an adverse effect on some elements in the system.

Unwanted heat is stripped off of the exhaust gas in the heat exchanger 4. Removing the unwanted heat from the exhaust gas makes it safer to add oxygen at a later point in the system.

The air reservoir 5 provides a large enough supply of gases for efficient engine operation. It also provides a suitable location for a system air filter 6.

Gas is filtered by gas filter 6 of large and small particles as soot and dust. Intake air opening 7 of the engine carburetor is used to seal out ambient air.

Oxygen Injection Side

Compressed oxygen tank A is of typical industrial use. Oxygen regulator B is also of typical industrial use. In low pressure reservoir C, oxygen is made available to the oxygen metering pump by this low pressure reservoir. It also serves as a buffer zone between the high pressure regulated tank side and the metering pump that must draw its oxygen from a very low pressure low volume area for consistent metering during operation.

Oxygen metering pump D is a single stage diaphragm type of low pressure air compressor. It provides a consistently accurate amount of oxygen to the recycled gas.

By pass valve E works in conjunction with valve F, which is a pressure relief valve. By pass valve E can be manually set to increase the pressure on relief valve F, or reduce the pressure on valve F, and cease oxygen injection, which would cease operation.

Oxygen injection valve F is a low pressure relief valve. It serves the purpose of raising the threshhold pressure of oxygen injection. It also serves the purpose of preventing gas from back feeding into and contaminating the oxygen injection system.

With the "CLOSED LOOP SYSTEM" apparatus installed, the internal combustion engine performs the same in all ways, except for one. All engine exhaust is not vented into the atmosphere. The exhaust is recycled through the engine with concentrated oxygen added to replace the oxygen consumed in the combustion process. As oxygen is continually added to the ongoing combustion process, some of the exhaust gas must be removed, (vented) so that oxygen can be added without building up excessive pressures.

Figure 2:
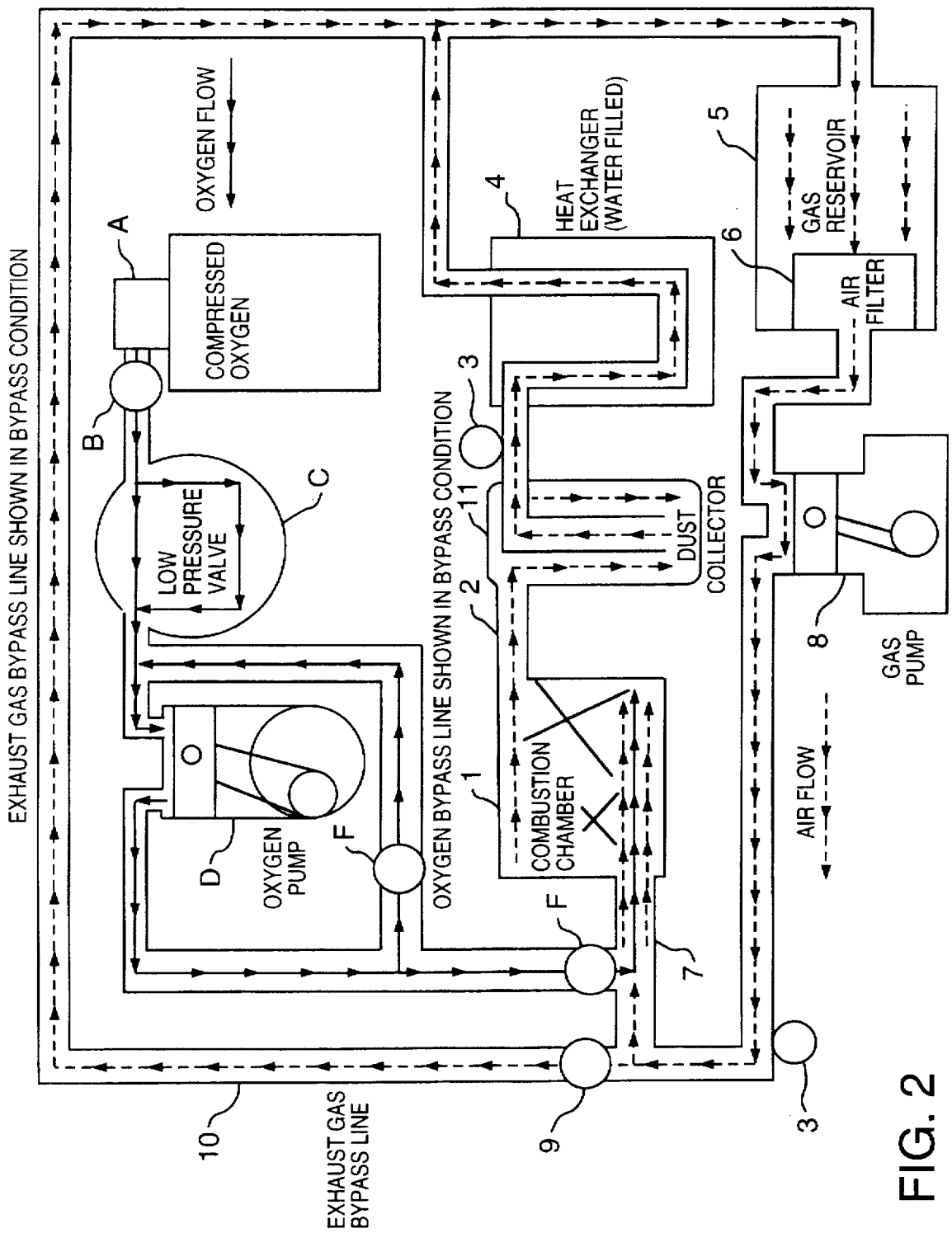
FIG. 2 is a schematic diagram showing an gas by-pass line in by-pass condition for a solid fuel combination system of the present invention.
Figure 3:
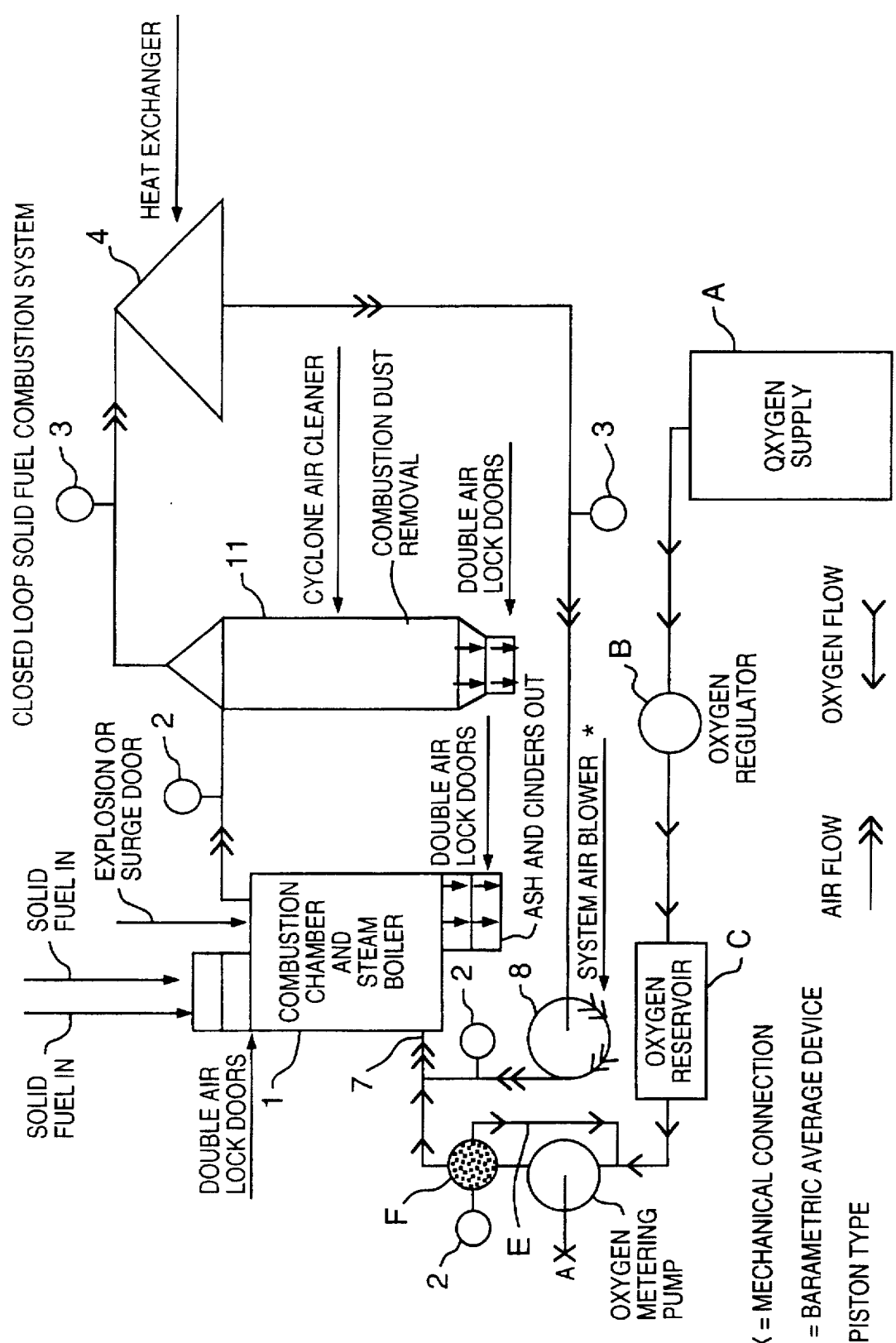
FIG. 3 is a schematic diagram showing the invention applied to a closed loop solid fuel combustion system of the present invention without an exhaust gas by-pass.

Closed Loop Solid Fuel Combustion System (FIGS. 2 and 3)

Combustion chamber: Solid fuel enters through air lock doors not shown on the drawing. Inside combustion occurs the same as in an atmosphere ventilated system. Ash and cinders may be removed through air lock doors (FIG. 3).

Thermometer 2 indicates combustion gas temperature.

Cyclone dust collector 11 allows solid particles of combustion (soot) to drop out of the air and settle to the bottom, where these solids may be removed through air lock doors, not shown on drawing.

Two bleed off or vent valves 3 are provided to protect the system from a build up of gas pressure that may have an adverse effect upon some elements in the system.

Unwanted heat is stripped off of the combustion gas, making it safer to add oxygen at a later point in the system. A water filled heat exchanger 4 would be used in a permanent installation, as compared to air type that would be more likely used on a mobile device for weight reduction purposes.

The air reservoir 5 provides a large enough supply of air for efficient operation. It also provides a suitable location for a system air filter 6.

Air is filtered of small particles of soot and dust.

System air pump 8 is an air compressor, piston type of pump. It provides positive air movement within the system. A system air pump is not needed in an internal combustion engine application because air movement within that system is inherent by design.

By-pass valve 9 and by-pass line (FIG. 2) connect the air intake manifold to the exit side of the heat exchanger.

The vacuum guage 10 indicates the draw (pull) being placed upon the air in the system. It indicates in IN. HG.

Oxygen Injection Side

A compressed oxygen tank A is of typical industrial use. Oxygen regulator B is of typical industrial use. Oxygen is made available to the oxygen metering pump by this low pressure reservoir C. It also serves as a buffer zone between the high pressure regulated tank side and the metering pump that must draw its oxygen from a very low pressure low volume area for consistent operation. Oxygen metering pump D is a single stage diaphragm type of low pressure air compressor. It provides a consistently accurate amount of oxygen to the recycled gas. By pass valve E works in conjunction with valve F which is a pressure relief valve. By pass valve E can be manually set to increase the pressure on relief valve F, or reduce the pressure on valve F and cease oxygen injection which would cease operation. The oxygen injector is a low pressure relief valve F. It serves the purpose of raising the threshhold pressure of oxygen injection. It also serves the purpose of preventing gas from back feeding into and contaminating the oxygen injection system.

In operation of the "CLOSED LOOP" solid fuel system, during combustion, as the fuel is being consumed, oxygen is added to the air as it is recycled through the combustion chamber. Combustion occurs in the same way as it would in an atmosphere vented system, with the exception that the amount of pollution is minimal. As the oxygen is continually added to the ongoing combustion process, some of this gas must be removed so that oxygen can be added, without building up excessive pressures. The end result is that there is far less air pollution during the combustion of solid fuels, regardless of their composition or contamination. Additionally, there are two sources of heat, the combustion chamber and the heat exchanger.

I claim:

1. A loop combustion apparatus comprising: a combustion device having a combustion chamber, a heat exchanger connected to an exhaust port of said device for receiving and cooling exhaust gases from said combustion chamber, a reservoir connected for receiving cooled gases from said heat exchanger with enlarged reservoir storage capacity as compared to the capacity of said heat exchanger, a filter connected to said reservoir for filtering particulate matter from gases contained in said reservoir, said filter connected to an intake for said combustion chamber for supplying the filtered gases to said combustion chamber from a loop exhaust system, means for circulating exhaust gases in said system, oxygen supply means connected for supplying metered quantities of oxygen to said intake for thereby supplying metered oxygen to said combustion chamber with filtered recycle exhaust gases, and at least one pressure relief valve disposed in said loop exhaust system for relieving small quantities of gases to atmosphere when a predetermined pressure is attained.

2. The loop combustion apparatus of claim 1, including one of said pressure relief valves disposed in said loop exhaust system between said exhaust port for said combustion chamber and said heat exchanger.

3. The loop combustion apparatus of claim 2, including a second pressure relief valve disposed between said filter and said intake.

4. The loop combustion apparatus of claim 1, said means for circulating comprises an internal combustion engine with a combustion chamber which provides said combustion chamber.

5. The loop combustion apparatus of claim 4, including a compression buffer chamber disposed in said loop exhaust system between said exhaust port for said combustion chamber and said heat exchanger.

6. The loop combustion apparatus of claim 1, wherein said combustion chamber is an incinerator chamber and said means for circulating is comprised of a gas pump disposed in said loop exhaust system.

7. The loop combustion apparatus of claim 6, including a dust collector disposed in said closed loop exhaust system between said exhaust port and said heat exchanger.

8. The loop combustion apparatus of claim 6, including an exhaust gas by-pass loop connected to said loop exhaust system between said intake and said reservoir, and including an exhaust gas by-pass valve for regulating flow through said exhaust gas by-pass.

9. The loop combustion apparatus of claim 1, said oxygen supply means including an oxygen supply, a regulator connected to said oxygen supply for regulating the supply of oxygen therefrom, a low pressure reservoir connected to said regulator for storing oxygen therein at low pressure, a metering pump connected between said oxygen low pressure reservoir and said intake for supplying metered quantities of oxygen to said combustion chamber, and oxygen by-pass means with a by-pass valve for providing and regulating recycle of oxygen from said metering pump for thereby ultimately regulating the flow of oxygen to said combustion chamber with said by-pass valve.

10. The loop combustion apparatus of claim 9, including a check-valve disposed between said oxygen supply means and said intake for preventing exhaust gases from entering said oxygen supply means.

\* \* \* \* \*